Sept. 14, 1954  D. E. PRIEST  2,689,131
TOOL WITH SHANK AND REMOVABLE BLADE
Filed March 28, 1952
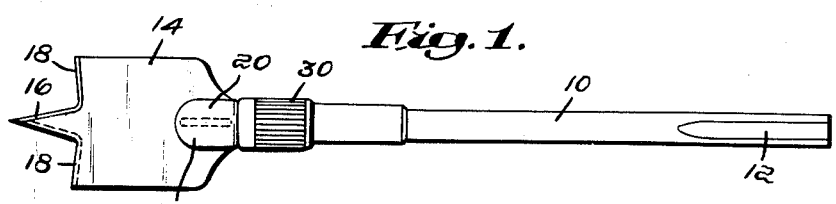
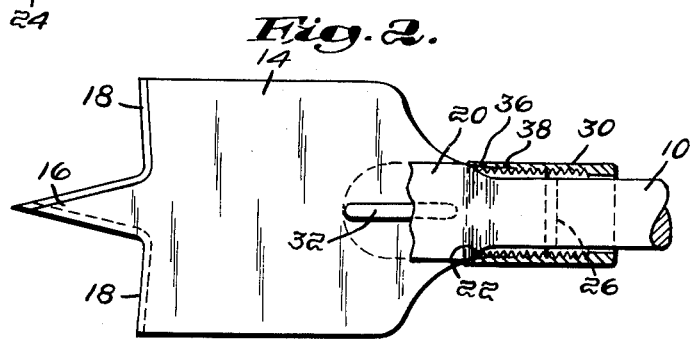
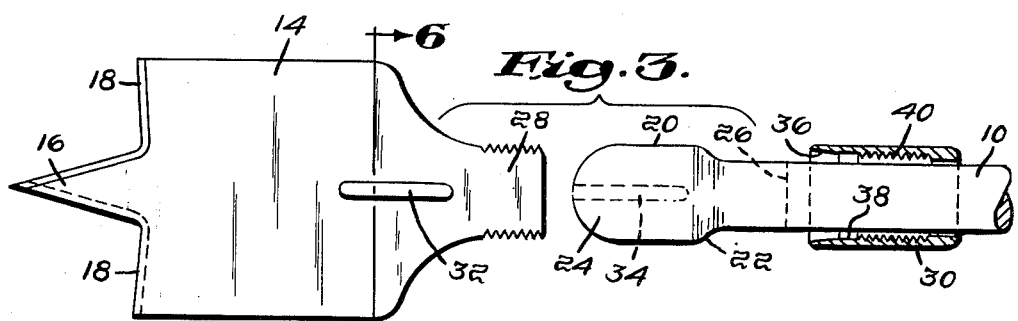
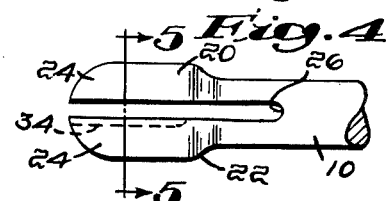
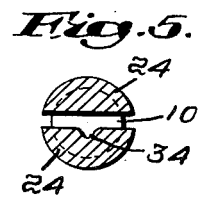
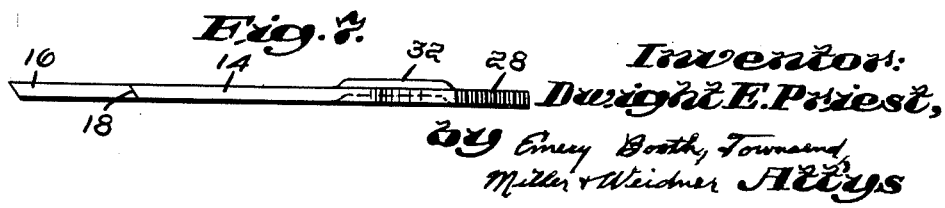
Inventor:
Dwight E. Priest,
by Emery, Booth, Townsend,
Miller & Weidner Attys Patented Sept. 14, 1954

2,689,131

UNITED STATES PATENT OFFICE 2,689,131

TOOL WITH SHANK AND REMOVABLE BLADE

Dwight E. Priest, Southboro, Mass., assignor to Parker Manufacturing Company, Worcester, Mass., a corporation of Massachusetts Application March 28, 1952, Serial No. 279,018

5 Claims. (Cl. 279—101)

1

This invention relates to a tool comprising a shank or supporting member and a blade or bit readily assembled therewith, for example to permit the substitution of another blade of different size, the shank providing means for positioning the blade and working with it, either as a handle for direct manual control or through an appliance such as a brace or a source of mechanical power. The object of the invention is to provide a simple, inexpensive construction which will securely hold together blade and shank and permit them to be easily assembled and disassembled.

As an example of the application of the invention, I herewith illustrate its embodiment in a wood boring tool adapted to be rotated at high speed by an electric drill or like source of power. Power tools, commonly termed bits, adapted for such work and having a blade similar to that here illustrated, integrally forged as a part of a shank which is secured in the drill chuck, are now in common use. The invention permits the use of a set of blades in a range of sizes, individually small and cheap to produce, with a common shank.

My invention will be well understood by reference to the following description of the specific embodiment referred to, as shown in the accompanying drawings, wherein:

Fig. 1 is an elevation of the assembled blade and shank;

Fig. 2 is an enlarged view of the blade and adjacent end of the shank, partly in section and partly broken away;

Fig. 3 shows the parts of Fig. 3 longitudinally separated;

Fig. 4 is a view of the end of the shank as seen from above viewing Fig. 3;

Fig. 5 is a section on line 5—5 of Fig. 4;

Fig. 6 is a section on line 6—6 of Fig. 3; and

Fig. 7 is an edge view of the blade.

Referring to Fig. 1 of the drawings, wherein blade and shank are shown assembled ready for use, the tool comprises a shank 10 having a squared end 12 to fit the drill chuck and a flat blade 14 (see Fig. 7) having a long pilot 16, and radially extending cutting edges 18, conveniently somewhat forwardly inclined. These features in themselves are old in a one-piece tool.

Herein the shank 10 is shown with an enlarged head 20 having a rearwardly coned abutment surface 22 for purposes which will appear. As best seen in Figs. 4 and 5 the head end of the shank is provided with a diametrical recess defining two holding arms 24 between which the blade is received. The recess is extended rearwardly past the coned surface 22 of the head into the smaller portion of the shank, and its bottom 26 provides a seat for the blade.

The blade 14 is provided with a rearward extension 28 which, when the blade is seated against seat 26, is received in the recessed shank rearwardly of the abutment 22. The rearward end of the extension 28 engages the seat 26 and in the present example its end is squared off so that the engagement is along a line perpendicular to the axis of the shank. The extension is provided with segmental threads, to which it is unnecessary to apply a reference numeral, which are exposed at the exterior of the shank. The exterior surfaces of the arms, rearwardly of the abutment, are smooth and free from threads and a sufficient portion of the segmental thread extends beyond these surfaces to form an efficient threaded joint. That is, at least the major or crest diameter of the threads is greater than the diameter of the shank at that location, and conveniently, the minor or root diameter may be larger.

If the blade is inserted between the arms 24 of the shank and seated against seat 26, an internally threaded sleeve or nut 30, conveniently of a form presently to be described, may be run up onto the segmental threads, and engaging the abutment 22, clamp the blade against its seat. If the blade is not fully inserted but the threads catch, the sleeve will draw the blade down to its seat.

To facilitate the assembly with the axis of the extension at least substantially aligned with the axis of the shank cooperating, longitudinally disposed guiding means may be provided, herein exemplified by a rib 32 (see Fig. 7) struck up from blade 14, and a cooperating groove or keyway in one of the arms (see Fig. 5).

The form of the sleeve 30 herein disclosed, which has several advantages, will next be described. The minimum internal diameter of the sleeve is desirably larger than the external diameter of the arms 24 rearwardly of abutment 22, to provide for easy sliding movement along the shank and a slight lateral displacement of its axis relative to that of the shank before it engages the abutment.

The end of the sleeve which faces the abutment 22 is preferably formed with a correspondingly coned, internal surface 36 leading to a counterbore 38 to the rear of which is an internal thread 40 for mating with the segmental threads of extension 28. The minor diameter of this thread is greater than the external diameter of the arms rearwardly of the abutment 22.

An important feature of the invention is that the blade may be quickly, and even carelessly, placed between the arms without particular exactitude relative to its final position, either with respect to the seat or the axis of the shank, and yet be easily and quickly clamped. The rib 32 and the groove 34, if present, tend to align the axis although, for convenience in the assembly, they are designed to be somewhat loose. Particularly if the blade is not inserted home against the bottom 26 of the recess, the extension may be somewhat cocked relative to the shank. When the sleeve 30 is advanced the coned end 36 engages the rear of the extension and serves to align it with the axis of the female thread 40. The slight lateral play of the sleeve on the shank is also of advantage in this connection. When the coned surface 36 of the sleeve engages the coned surface 22 the sleeve is centered relative to the axis, and after it has acted to draw the blade down against its seat 26, continued rotative movement of the sleeve compresses the two arms 24 into clamping engagement with the blade as a result of the cooperation of these two coned surfaces.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A tool having a shank which supports a removable blade, the shank having a deep diametrical recess across one end defining two holding arms and an external abutment at an intermediate point of the arms, the blade having a portion to enter between the arms including a flat rearward extension to seat on the bottom of the recess, the extension having segmental threads exposed outwardly of the shank and an internally threaded sleeve freely slidable along the shank for meshing with the segmental threads and engaging the abutment, the external diameter of the shank at the location of the arms being smaller than the minor diameter of the threads of the sleeve.

2. A tool as set forth in claim 1, wherein there are cooperating guiding means longitudinally disposed on the blade and inner surface of an arm to facilitate the positioning of the blade, with its extension coaxial with the shank.

3. A tool as set forth in claim 1, wherein the sleeve has an internally coned surface for initially engaging the extension to facilitate axial alignment of the thread on the extension and the thread on the sleeve.

4. A tool having a shank which supports a removable blade, the shank having an enlarged head with a rearwardly facing coned shoulder, the head being diametrically divided and also a portion of the shank rearwardly of the head to define two holding arms, the blade being formed to enter the space between the arms and having a rearward extension to seat at the base of the arms, the extension having segmental threads exposed outwardly of the arms at the rear of said head, the shank arms themselves being free of exterior threads, and an interiorly threaded sleeve freely slidable along the shank having an inwardly coned end and rearwardy thereof a female thread for meshing with said segmental threads, the engagement of the coned surfaces acting to permit the sleeve to draw the blade tightly to its seat and to close the arms into gripping engagement with the blade.

5. A tool having a shank which supports a removable blade, the shank having a deep diametrical recess across one end defining two holding arms and having an external abutment at an intermediate point of the arms, the blade having a portion to enter between the arms including a flat rearward extension to seat on the bottom of the recess, the extension having segmental threads and an internally threaded sleeve freely slidable along the shank for meshing with the segmental threads and engaging the abutment, the major diameter of the segmental threads and the minor diameter of the thread of the sleeve being greater than the diameter of the arms rearwardly of the abutment.

References Cited in the file of this patent

UNITED STATES PATENTS

| Number | Name | Date |
| --- | --- | --- |
| 125,759 | Richards | Apr. 16, 1872 |
| 514,004 | Howard | Feb. 6, 1894 |
| 1,240,729 | Kasperson | Sept. 18, 1917 |
| 1,326,507 | Humason | Dec. 30, 1919 |
| 2,129,590 | Schelot et al. | Sept. 6, 1938 |
| 2,543,206 | Smith | Feb. 27, 1951 |